US012062915B2

United States Patent
Xu et al.

(10) Patent No.: US 12,062,915 B2
(45) Date of Patent: Aug. 13, 2024

(54) SUBMODULE HYBRID MMC WITH LOW FULL-BRIDGE RATIO AND DC FAULT PROCESSING METHOD THEREOF

(71) Applicant: Zhejiang University, Hangzhou (CN)

(72) Inventors: Zheng Xu, Hangzhou (CN); Yuzhe Xu, Hangzhou (CN); Zheren Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/312,809

(22) PCT Filed: Oct. 28, 2020

(86) PCT No.: PCT/CN2020/124293
§ 371 (c)(1),
(2) Date: Jun. 10, 2021

(87) PCT Pub. No.: WO2021/164304
PCT Pub. Date: Aug. 26, 2021

(65) Prior Publication Data
US 2024/0030715 A1    Jan. 25, 2024

(30) Foreign Application Priority Data
Feb. 20, 2020    (CN) .......................... 202010123850.6

(51) Int. Cl.
*H02M 7/483*    (2007.01)
*H02J 3/36*    (2006.01)
*H02M 1/32*    (2007.01)

(52) U.S. Cl.
CPC ............. *H02J 3/36* (2013.01); *H02M 7/4835* (2021.05); *H02M 1/32* (2013.01)

(58) Field of Classification Search
CPC ...... H02M 1/32; H02M 1/325; H02M 7/4835; H02J 3/36; H02H 3/087; H02H 7/1206; H02H 7/1257; H02H 7/268
See application file for complete search history.

(56) References Cited

U.S. PATENT DOCUMENTS 9,800,171 B2 * 10/2017 Tahata .................. H02H 3/087
10,910,824 B1 *  2/2021 Jia ......................... H02M 7/537
(Continued)

FOREIGN PATENT DOCUMENTS

CN      103701145 A       4/2014
CN      105790238 A *     7/2016  ............. H02H 7/262
(Continued)

OTHER PUBLICATIONS

Machine translation of CN-105790238-A. Obtained via USPTO internal databases. Original document published Jul. 2016. (Year: 2016).*

(Continued)

*Primary Examiner* — Fred E Finch, III
(74) *Attorney, Agent, or Firm* — Goodhue, Coleman & Owens, P.C.

(57) ABSTRACT

The present disclosure discloses a sub-module hybrid MMC with low full-bridge ratio and a DC fault processing method thereof. The hybrid MMC prevents the energy at the AC side from entering a DC system by artificially creating three-phase interphase short circuit at the AC side of a converter in the DC fault processing process, which greatly reduces the ratio of full-bridge sub-modules required for DC fault processing. Moreover, the hybrid MMC has the same DC fault processing speed as the sub-module hybrid MMC with high full-bridge. The duration of the artificially created three-phase interphase short circuit fault in the fault processing process does not exceed 30 ms, which will not have a great impact on the AC system. Compared with the
(Continued)

existing sub-module hybrid MMC, the MMC of the present disclosure can also deal with DC faults under the condition of using fewer full-bridge sub-modules, which can reduce the number of required power electronic devices, greatly reduces the cost of building an overhead line high-voltage flexible DC transmission system, and has very strong reference significance and use value in engineering.

6 Claims, 5 Drawing Sheets

(56) References Cited

U.S. PATENT DOCUMENTS

| | | | |
|---|---|---|---|
| 2016/0233762 A1 | 8/2016 | Mathew et al. | |
| 2019/0312504 A1* | 10/2019 | Kim | H02M 1/32 |
| 2022/0094260 A1* | 3/2022 | Deng | H02M 1/0095 |
| 2023/0268845 A1* | 8/2023 | Zhou | H02M 7/487 363/132 |
| 2023/0352942 A1* | 11/2023 | Nakamura | H02J 3/36 |

FOREIGN PATENT DOCUMENTS

| | | | | |
|---|---|---|---|---|
| CN | 105977954 A | | 9/2016 | |
| CN | 109217265 A | * | 1/2019 | ............ H02H 7/268 |
| CN | 109217265 A | | 1/2019 | |
| CN | 109617439 A | | 4/2019 | |
| CN | 111049407 A | | 4/2020 | |
| CN | 111224569 A | | 6/2020 | |

OTHER PUBLICATIONS

Machine translation of CN-109217265-A. Obtained via USPTO internal databases. Original document published Jan. 2019. (Year: 2019).*

Deng Shuairong, Zhou Niancheng, Wang Yueyue, Lian Rui, Ran Li. 2018. Research on DC Fault Isolation Voltage Based on Proportions of Full Bridge Sub-modules of Hybrid MMC. High Voltage Engineering, vol. 44, No. 10: 3250-3257.

First Office Action of Chinese Patent Application No. 202010123850.6, Sep. 30, 2020, 3 pages.

International Search Report, PCT/US2020/124293, Jan. 27, 2021 5 Pages.

* cited by examiner

SUBMODULE HYBRID MMC WITH LOW FULL-BRIDGE RATIO AND DC FAULT PROCESSING METHOD THEREOF

CROSS REFERENCE TO RELATED APPLICATION(S)

This patent application claims the benefit and priority of Chinese Patent Application No. 202010123850.6 filed to China National Intellectual Property Administration on Feb. 20, 2020 and entitled as sub-module hybrid MMC with low full-bridge ratio and DC fault processing method thereof the disclosure of which is incorporated by reference herein in its entirety as part of the present application.

TECHNICAL FIELD

The present disclosure relates to the technical field of power electronics, in particular to a sub-module hybrid MMC with low full-bridge ratio and a DC fault processing method thereof.

BACKGROUND ART

With the vigorous development of power electronics technology, the high voltage direct current (HVDC) technology based on modular multilevel converter (MMC) is attracting more and more attention. Compared with other voltage source converter topologies, a modular multilevel converter has obvious advantages. Because of the cascade of basic operation units, this topology avoids the problems that a large number of switching devices are directly connected in series and there is no consistent triggering; this topology can output high-quality voltage waveforms while ensuring economy, so that it has been rapidly applied to new energy grid connection and offshore wind power transmission in recent years.

The main problem faced by the MMC-HVDC using overhead transmission lines is how to deal with DC line faults. At present, there are two feasible DC fault processing schemes: 1. using DC circuit breakers; 2. using a sub-module with DC fault self-clearing capability (such as a full-bridge sub-module, a clamping sub-module or other variant sub-modules). The first network construction method adopts the scheme of a modular multilevel converter plus a DC circuit breaker based on a half-bridge sub-module, which is suitable for DC power grid with arbitrary number of terminals. The second network construction method adopts the MMC with DC fault self-clearing capability, such as the MMC based on a full-bridge sub-module, but no DC circuit breaker is required. This network construction method is suitable for small-scale DC power grid with less than 10 terminals. When the network construction method of a half-bridge sub-module MMC plus a DC circuit breaker is adopted, the converter station is usually required to continue to operate during DC line fault, and cannot be locked. The fault line is quickly removed by the DC circuit breaker, and its fault processing principle is similar to that of the AC power grid. When the network construction method without a DC circuit breaker is adopted, the relevant converters in the network are closed during the DC line fault. The fault current reaches zero and stabilizes at zero value in about 10 ms after being locked. The fault line is isolated by an isolating switch, and then the relevant converters are unlocked to resume power transmission. The time from starting fault to resuming power transmission is generally about 20 ms, and the impact on the AC power grid is usually within an acceptable range.

When the DC power grid is constructed by the method of a half-bridge sub-module MMC plus a DC circuit breaker, the DC circuit breaker becomes the key component of the DC power grid. At present, the construction schemes of high-voltage DC circuit breakers mainly focus on three types, namely, traditional mechanical circuit breakers based on conventional switches, solid-state circuit breakers based on pure power electronic devices and hybrid circuit breakers based on their combination. Although technically feasible high-voltage DC circuit breakers have been developed at present, they are too expensive and bulky to be widely used in power grid like AC circuit breakers.

When the DC power grid is constructed by using the MMC with DC fault self-clearing capability, taking a full-bridge sub-module as an example, compared with the half-bridge sub-module MMC with the same capacity and voltage level, the number of power electronic devices used by the full-bridge MMC is almost twice, which not only increases the investment cost, but also introduces more operating losses.

Therefore, some literatures put forward a sub-module hybrid MMC converter station consisted of a half-bridge sub-module and a full-bridge sub-module, which not only has the DC fault processing capability, but also reduces the number of power electronic devices and operating losses to a certain extent compared with a full-bridge MMC. However, in order to meet the demand of DC fault processing speed, it is usually required that the number of full-bridge sub-modules in the hybrid sub-module accounts for more than 50% of all sub-modules, and even reaches 75% in existing practical engineering, which greatly weakens the advantages of the sub-module hybrid MMC over the full-bridge MMC, and increases the construction cost and operation loss.

SUMMARY

Based on this, the purpose of the present disclosure is to provide a sub-module hybrid MMC with low full-bridge ratio and a DC fault processing method thereof. The hybrid MMC requires a lower ratio of full-bridge sub-modules, and has the same DC fault processing speed as the sub-module hybrid MMC with high full-bridge ratio, which greatly reduces the cost of building an overhead line high-voltage flexible DC transmission system, and has very strong reference significance and use value in engineering.

To achieve the above purpose, the present disclosure provides a sub-module hybrid MMC with low full-bridge ratio, wherein the MMC is a three-phase six-bridge-arm structure, and each phase contains an upper bridge arm and a lower bridge arm, wherein: each bridge arm consists of N sub-modules and a bridge-arm reactor which are connected in series, the N sub-modules comprise $N_1$ half-bridge sub-modules and $N_2$ full-bridge sub-modules, that is, $N=N_1+N_2$; the connection point between the upper bridge arm and the lower bridge arm of A phase and the connection point between the upper bridge arm and the lower bridge arm of B phase are connected by an AC circuit breaker BR1, and the connection point between the upper bridge arm and the lower bridge arm of B phase and the connection point between the upper bridge arm and the lower bridge arm of C phase are connected by an AC circuit breaker BR2, where N, $N_1$ and $N_2$ are all natural numbers greater than 1.

Further, the number $N_2$ of full-bridge sub-modules in each bridge arm is 10% N to N (preferably less than or equal to 20% N).

Further, the high voltage end of the DC side of the MMC is connected with a DC line through a smoothing reactor and an ultra-high-speed mechanical switch in sequence.

A DC fault processing method of the sub-module hybrid MMC with low full-bridge ratio comprises the steps of:

(1) during normal operation, keeping the AC circuit breakers BR1 and BR2 of the MMC in the open state, keeping the ultra-high speed mechanical switch in the closed state, and monitoring the bridge-arm current of each bridge arm of the MMC at the same time;

(2) after the DC fault occurs, if the converter station where the MMC is located first detects that the bridge-arm current exceeds the threshold value, immediately locking all sub-modules of the MMC, closing the AC circuit breakers BR1 and BR2 at the same time, sending an opening signal to the ultra-high-speed mechanical switch, and then sending a locking instruction to the converter station at the other end connected with the MMC;

(3) when the converter station at the other end receives the locking instruction or detects that the current of its own MMC bridge arm exceeds the threshold value, immediately locking all sub-modules of the MMC, closing the AC circuit breakers BR1 and BR2, and sending an opening signal to the ultra-high speed mechanical switch;

(4) after the converter stations at both ends are locked for a certain period of time $t_3$, opening the ultrahigh-speed mechanical switches at both ends of the fault line after the flowing current is reduced to 0, so as to realize the physical isolation of the fault line, and at the same time, sending an opening signal from the converter stations at both ends to the AC circuit breakers BR1 and BR2 of the MMC;

(5) after a certain period of time $t_4$, enabling the AC circuit breakers BR1 and BR2 of the MMC at both ends to return to the open state, and completing the DC fault processing at this point.

Further, in step (2) and step (3), it is determined that the MMC bridge-arm current exceeds the threshold value when the following relation holds;

$$\max(I_{pa},I_{na},I_{pb},I_{nb},I_{pc},I_{nc}) > 2I_{rate}$$

where $I_{pa}$ is the upper bridge-arm current of A phase of the MMC, $I_{na}$ is the lower bridge-arm current of A phase of the MMC, $I_{pb}$ is the upper bridge-arm current of B phase of the MMC, Ira, is the lower bridge-arm current of B phase of the MMC, $I_{pc}$ is the upper bridge-arm current of C phase of the MMC, $I_{nc}$ is the lower bridge-arm current of C phase of the MMC, $I_{rate}$ is the rated current of the IGBT in a sub-module.

Further, in step (5), reclosing operation is required after the DC fault processing is completed, and the specific implementation mode is as follows:

for temporary DC fault, after de-ionization time $t_5$, sending a closing signal to the ultra-high speed mechanical switches at both ends of the fault line, and at the same time, sending an unlocking instruction to the MMC at both ends, so that the system resumes to the steady-state operation state;

for permanent DC fault, after de-ionization time $t_5$, sending a closing signal to the ultra-high speed mechanical switches at both ends of the fault line, and at the same time, sending an unlocking instruction to the MMC at both ends; since it is a permanent DC fault, if it is detected again that the bridge-arm current of the MMC of a converter station at one end exceeds the threshold value after $t_6$, performing the DC fault processing again according to steps (2)-(5).

Further, after the full-bridge sub-module in the MMC is locked, the capacitor of the sub-module is reversely connected to the DC fault line to form an LC oscillation circuit together with the smoothing reactor, the bridge-arm reactor and the DC line, so that the DC fault current is reduced to 0 within $t_3$ after the sub-module is locked, and finally the ultra-high speed mechanical switch is opened.

Further, during the $t_3+t_4$ period of fault processing, the three-phase interphase short circuit is actively created at the MMC valve side by closing the AC circuit breakers BR1 and BR2, so as to prevent the current of the AC system from flowing into the DC system and accelerate the process that the fault current oscillates to 0, and the total duration of $t_3+t_4$ does not exceed 30 ms.

According to the specific embodiment provided by the present disclosure, the present disclosure discloses the following technical effects.

The present disclosure provides a sub-module hybrid MMC with low full-bridge ratio and a DC fault processing method thereof. Compared with the existing sub-module hybrid MMC, the present disclosure can also process DC faults under the condition of using fewer full-bridge sub-modules, thereby reducing the number of required power electronic devices and greatly reducing the construction cost of converter stations. In addition, compared with the existing sub-module hybrid MMC, the sub-module hybrid MMC with low full-bridge ratio provided by the present disclosure greatly reduces the operation loss.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a sub-module hybrid MMC with low full-bridge ratio and a DC fault processing method thereof. The hybrid MMC requires a lower ratio of full-bridge sub-modules, and has the same DC fault processing speed as the sub-module hybrid MMC with high full-bridge ratio, which greatly reduces the cost of building an overhead line high-voltage flexible DC transmission system, and has very strong reference significance and use value in engineering.

In order to make the above objects, features and advantages of the present disclosure more obvious and understandable, the present disclosure will be further explained in detail hereinafter with reference to the drawings and specific embodiments.

Figure 1:
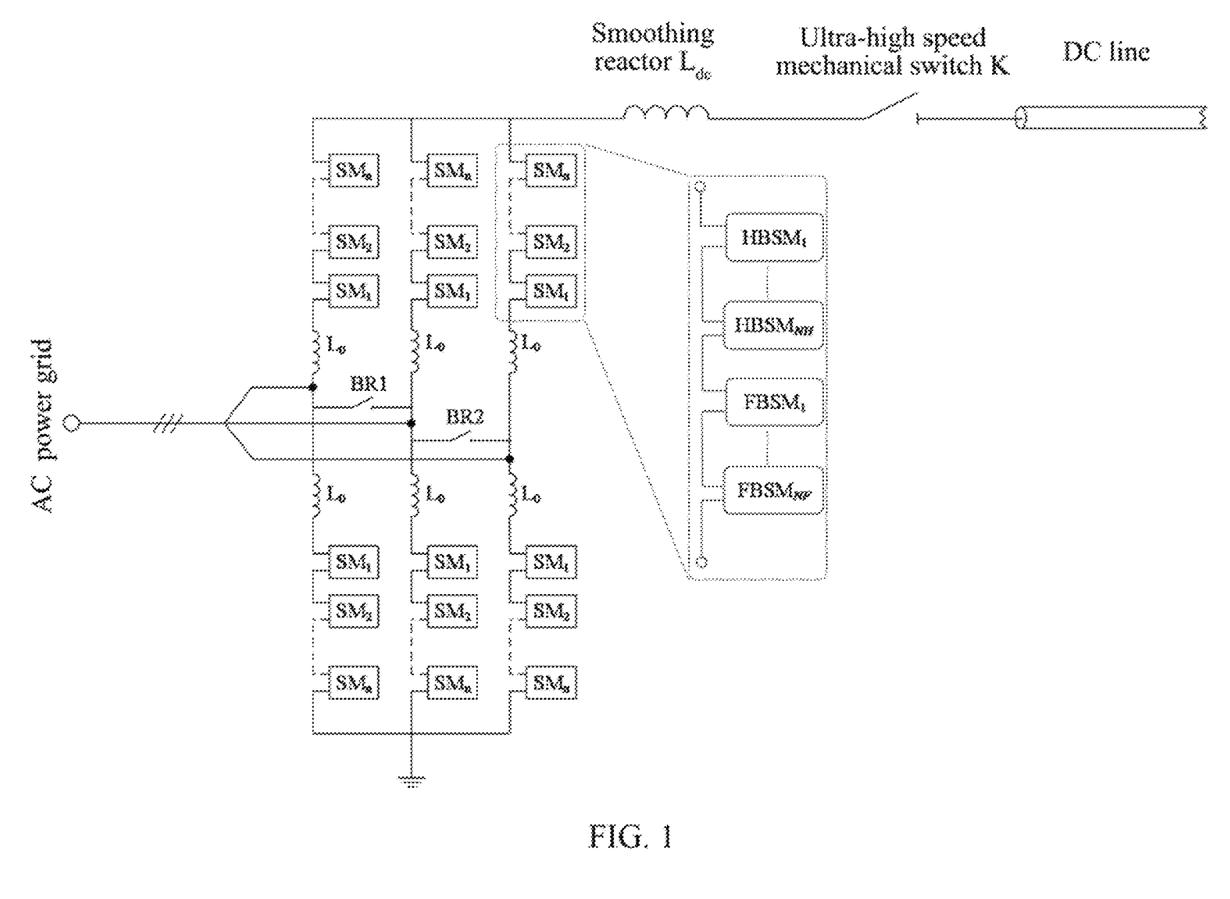
FIG. 1 is a schematic diagram of the topological structure of a sub-module hybrid MMC with low full-bridge ratio according to an embodiment of the present disclosure.

As shown in FIG. 1, the sub-module hybrid MMC with low full-bridge ratio of the present disclosure is a three-phase six-bridge-arm structure, which contains three phase units. Each phase unit contains an upper bridge arm and a lower bridge arm. Each bridge arm consists of N sub-modules and a bridge-arm reactor $L_0$ which are connected in series, comprising NH half-bridge sub-modules ($HBSM_1$-$HBSM_{NH}$) and NF full-bridge sub-modules ($FBSM_1$-$FBSM_{NF}$). The connection point between the upper bridge arm and the lower bridge arm of A phase and the connection point between the upper bridge arm and the lower bridge arm of B phase are connected by an AC circuit breaker BR1. The connection point between the upper bridge arm and the lower bridge arm of B phase and the connection point between the upper bridge arm and the lower bridge arm of C phase are connected by an AC circuit breaker BR2. The outlet of the DC side of the converter is connected with the DC line through a smoothing reactor Lac and an ultra-high-speed mechanical switch K. The number NF of full-bridge sub-modules in each bridge arm accounts for 20% of the number N of all sub-modules.

For the above hybrid MMC, the DC fault processing method thereof comprises the following steps.

(1) During normal operation, BR1 and BR2 are kept in the open state, K is kept in the closed state, and the bridge-arm current of each bridge arm is monitored at the same time, which is the upper bridge-arm current of A phase $I_{pa}$, the lower bridge-arm current of A phase $I_{na}$, the upper bridge-arm current of B phase $I_{pb}$, the lower bridge-arm current of B phase $I_{nb}$, the upper bridge-arm current of C phase $I_{pc}$, and the lower bridge-arm current of C $I_{nc}$, respectively;

(2) After the DC fault occurs, after $t_1$, if the converter station first detects that the current of each bridge arm satisfies the following relational expression, all sub-modules are immediately locked, the AC switches BR1 and BR2 are closed, an opening signal is sent to K, and a locking instruction is sent to other converter stations at the same time;

$$\max(I_{pa}, I_{na}, I_{pb}, I_{nb}, I_{pc}, I_{nc}) \geq 2I_{rate}$$

where $I_{rate}$ is the rated current of the IGBT in the used sub-module.

(3) After other converter stations receive the locking instruction or detect that the current of its own bridge arm exceeds the threshold value, a locking instruction is sent to all sub-modules, and the AC switches BR1 and BR2 are closed, in which $t_2$ passes from locking the first converter station to completing locking all converter stations in the DC network;

(4) After all the converter stations are locked for $t_3$, the ultrahigh-speed mechanical switches K at both ends of the fault line are opened after the flowing current is reduced to 0, so as to realize the physical isolation of the fault line, and at the same time, an opening signal is sent to BR1 and BR2.

After the full-bridge sub-module is locked, the capacitor of the sub-module is reversely connected to the DC fault circuit to form an LC oscillation circuit together with the smoothing reactor, the bridge-arm reactor and the DC line, so that the DC fault current is reduced to 0 within $t_3$ after being locked, and finally the ultra-high speed mechanical switch K can be opened.

(5) After $t_4$ (a half period is maximal, that is, 10 ms), BR1 and BR2 return to the open state, and the DC fault processing is completed at this point. During the fault processing period ($t_3+t_4$), the three-phase interphase short circuit is actively created at the valve side of converter station by closing BR1 and BR2, so as to prevent the current of the AC system from flowing into the DC system and accelerate the process that the fault current oscillates to 0, and the total duration of $t_3+t_4$ does not exceed 30 ms.

Reclosing operation is required after the DC fault processing is completed, and the specific implementation mode is as follows:

for temporary DC fault, after de-ionization time $t_5$, sending a closing signal to the ultra-high speed mechanical switches K, and sending an unlocking instruction to the MMC at both ends, so that the system resumes to the steady-state operation state;

for permanent DC fault, after de-ionization time $t_5$, sending a closing signal to the ultra-high speed mechanical switches K, and sending an unlocking instruction to the MMC at both ends; since it is a permanent DC fault, if it is detected again that the bridge-arm current of a converter station exceeds the threshold value after $t_6$, processing the fault again according to the above steps.

Figure 2:
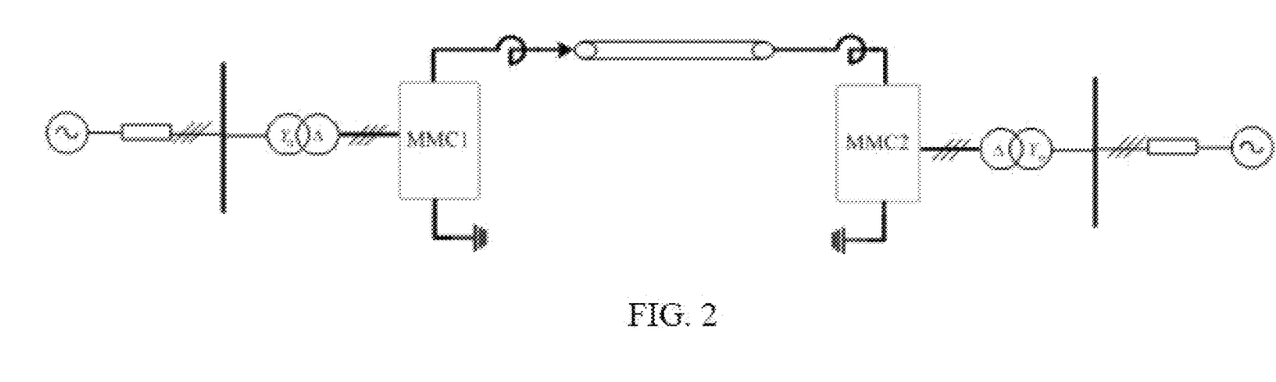
FIG. 2 is a schematic structural diagram of a test system according to an embodiment of the present disclosure.

In the specific implementation of the DC fault processing process of the DC power transmission test system at both ends shown in FIG. 2, the converter stations at both sides adopt the sub-module hybrid MMC with low full-bridge ratio proposed by the present disclosure. The specific parameters are shown in table 1:

TABLE 1

Parameter table

| parameter | value |
|---|---|
| DC voltage | 500 kV |
| rated power | 1500 MW |
| effective value of the voltage at the AC side | 230 kV |
| Equivalent reactance of the AC system | 10 mH |
| Transformation ratio of the converter transformer | 230 kV/210 kV |
| rated capacity of the converter transformer | 1800 MW |
| number of sub-modules per bridge arm | 200 |
| number of full bridge sub-modules per bridge arm | 50 |
| capacitance of a sub-module | 20000 μF |
| rated capacitance voltage of a sub-module | 2 kV |
| reactance of the bridge arm | 32 mH |
| line length | 250 km |
| rated current of IGBT | 3 kA |

Simulation scenario: in steady-state operation, MMC1 controls DC voltage, MMC2 controls transmission power, and MMC1 transmits 1500 MW active power to MMC2. At 1.5 s, a temporary ground short circuit fault occurs at the midpoint of the DC line, and the fault lasted for 0.1 s.
(1) After $t_1=2$ ms, MMC1 detects that the bridge-arm current exceeds the threshold value of 6 kA, immediately locks all sub-modules, closes the AC switches BR1 and BR2, sends an opening signal to mechanical switches k at both sides of the line, and sends a closing instruction to MMC2.
(2) After $t_2=1$ ms, MMC2 receives the closing instruction, locks all sub-modules and closes the AC switches BR1 and BR2, at which time all converter stations complete locking.
(3) After $t_3=11$ ms, the fault currents flowing through the mechanical switches K at both sides of the line are all reduced to 0, the switches at both sides are opened, the fault line is isolated, and the signals of opening BR1 and BR2 are sent to converter stations at both sides.
(4) After $t_4=9$ ms, BR1 and BR2 of converter stations at both sides resume to the open state, and the DC fault processing is completed at this point.

Figure 3:
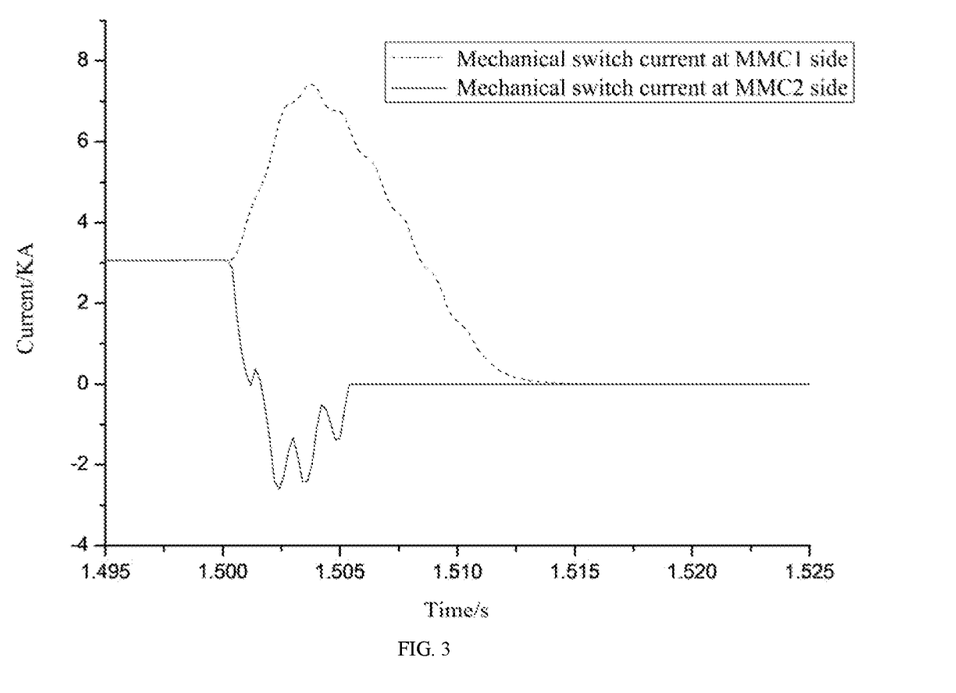
FIG. 3 is a schematic diagram of a current waveform flowing through an ultra-high-speed mechanical switch during fault processing according to an embodiment of the present disclosure.

The above process takes a total of 23 ms. The fault line is successfully isolated in 1.522 s, in which the closing duration of converter stations BR1 and BR2 at both sides is 20 ms, which has little impact on the AC system. The current waveform flowing through mechanical switches K at both sides of the line in the process is shown in FIG. 3.

Figure 4:
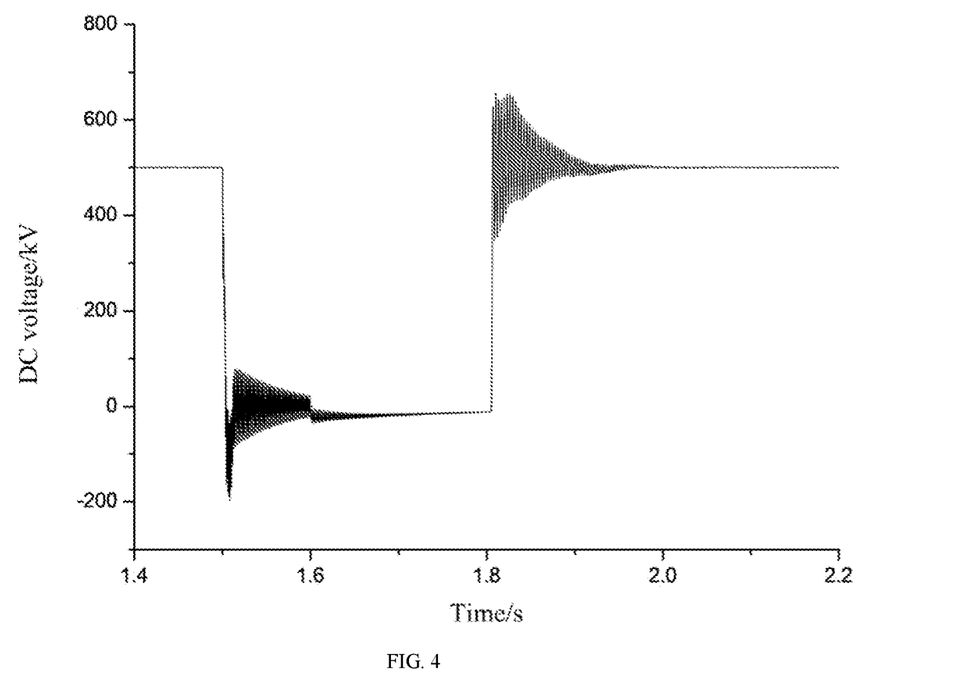
FIG. 4 is a schematic diagram of a DC voltage waveform of MMC1 during fault processing according to an embodiment of the present disclosure.
Figure 5:
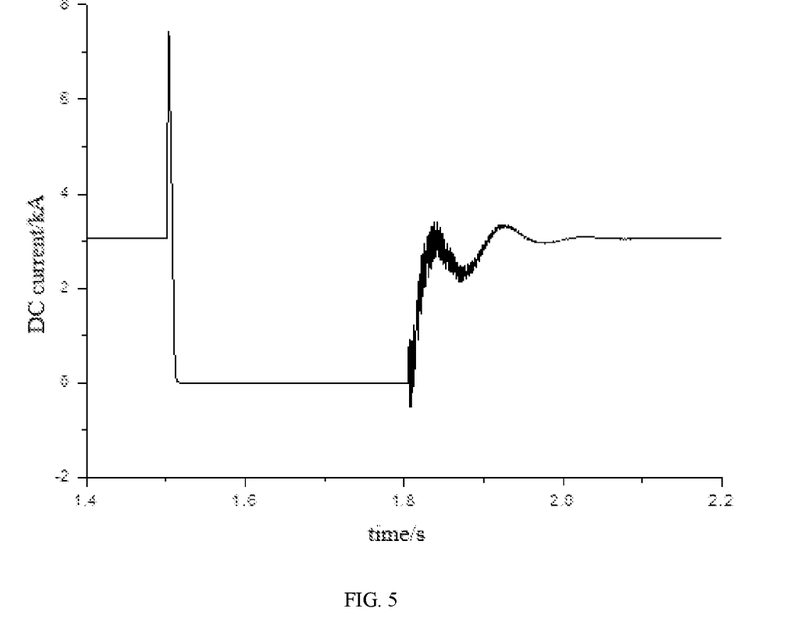
FIG. 5 is a schematic diagram of a DC current waveform of MMC1 during fault processing according to an embodiment of the present disclosure.
Figure 6:
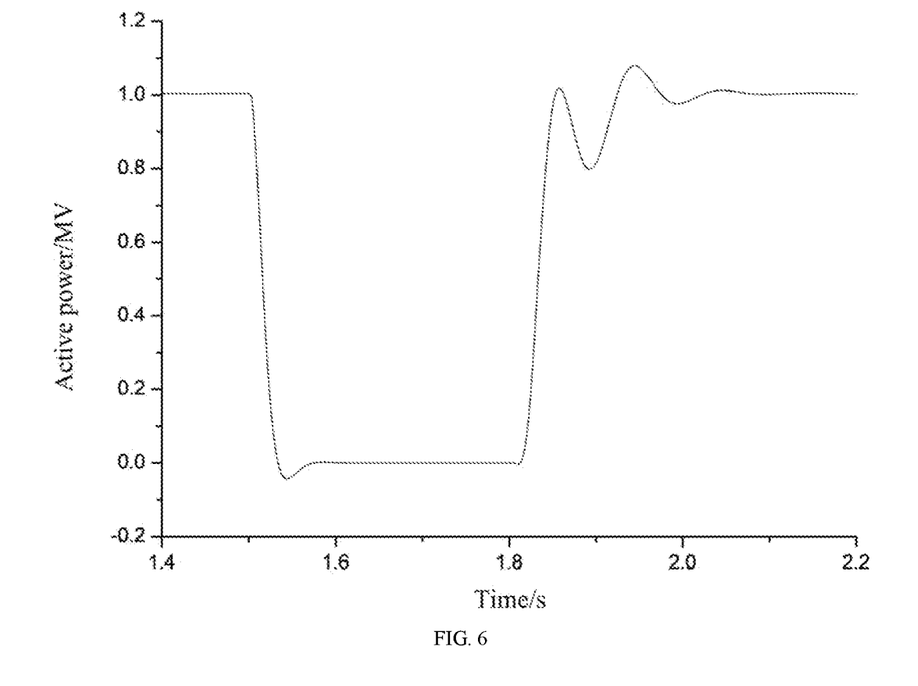
FIG. 6 is a schematic diagram of active power waveform transmitted from MMC1 to MMC2 during fault processing according to an embodiment of the present disclosure.

After fault processing, after de-ionization time $t_5=300$ ms, a closing signal is sent to the ultra-high-speed mechanical switch K, and an unlocking instruction is sent to the MMC at both sides, and finally the system returns to the steady-state operation state. In the process from fault occurring to resuming to the steady-state operation state, the DC voltage waveform of MMC1 is shown in FIG. 4, the DC current waveform is shown in FIG. 5, and the active power waveform transmitted from MMC1 to MMC2 is shown in FIG. 6.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. A DC fault processing method of a sub-module hybrid modular multilevel converter (MMC) with a low full-bridge ratio, the method comprising:
providing a three-phase six-bridge-arm structure, wherein each phase comprises an upper bridge arm and a lower bridge arm, wherein each bridge arm consists of N sub-modules and a bridge-arm reactor which are connected in series, the N sub-modules comprise $N_1$ half-bridge sub-modules and $N_2$ full-bridge sub-modules, that is, $N=N_1+N_2$; a connection point between an upper bridge arm and an lower bridge arm of an A phase of the MMC's three-phase six-bridge-arm structure and a connection point between an upper bridge arm and a lower bridge arm of a B phase of the MMC's three-phase six-bridge-arm structure are connected by an AC circuit breaker (BR1), and a connection point between the upper bridge arm and the lower bridge arm of the B phase and a connection point between an upper bridge arm and a lower bridge arm of a C phase of the MMC's three-phase six-bridge-arm structure are connected by an AC circuit breaker (BR2), where N, $N_1$ and $N_2$ are all natural numbers greater than 1, wherein a high voltage end of a DC side of the MMC is connected with a DC line through a smoothing reactor and an ultra-high-speed mechanical switch in sequence;
(1) during normal operation, keeping the AC circuit breakers (BR1) and (BR2) of a first MMC in an open state, keeping an ultra-high speed mechanical switch of the first MMC in a closed state, and monitoring a bridge-arm current of each bridge arm of the first MMC at the same time;
(2) after a DC fault occurs, when a first converter station where the first MMC is located first detects that the bridge-arm current exceeds a threshold value, immediately locking all sub-modules of the first MMC, closing the AC circuit breakers (BR1 and BR2) of the first MMC at the same time, sending an opening signal to the ultra-high-speed mechanical switch at the first MMC side on a HVDC transmission line, and then sending a locking instruction to a second converter station connected with the first MMC;
(3) when the second converter station where a second MMC is located receives the locking instruction or detects that a current of an MMC bridge arm of the second MMC exceeds the threshold value, immediately locking each sub-module of the second MMC, closing each AC circuit breaker (BR1) and (BR2) of the second MMC, and sending an opening signal to an ultra-high speed mechanical switch at the second MMC side on the HVDC transmission line;
(4) after the first and second converter stations are locked for a period of time $t_3$, completing opening of each ultrahigh-speed mechanical switch at the first MMC side and the second MMC side on the HVDC transmission line after a flowing current is reduced to 0, so as to realize physical isolation of the HVDC transmission line, and at the same time, sending an opening signal by the first and second converter stations to the corresponding AC circuit breakers (BR1) and (BR2) of the first MMC and the second MMC; and
(5) after a period of time $t_4$, completing opening of the AC circuit breakers (BR1) and (BR2) of the first MMC and the second MMC to complete the DC fault processing.

2. The DC fault processing method according to claim 1, wherein a number $N_2$ of full-bridge sub-modules in each bridge arm is 10% N to 20% N.

3. The DC fault processing method according to claim 1, wherein in step (2) and step (3), it is determined that the bridge-arm current exceeds the threshold value when $$\max(I_{pa}, I_{na}, I_{pb}, I_{nb}, I_{pc}, I_{nc}) > 2I_{rate},$$

where $I_{pa}$ is an upper bridge-arm current of A phase of the MMC, $I_{na}$ is a lower bridge-arm current of A phase of the MMC, $I_{pb}$ is an upper bridge-arm current of B phase of the MMC, $I_{nb}$ is a lower bridge-arm current of B phase of the MMC, $I_{pc}$ is an upper bridge-arm current of C phase of the MMC, $I_{nc}$ is a lower bridge-arm current of C phase of the MMC, $I_{rate}$ is a rated current of the IGBT in a sub-module.

4. The DC fault processing method according to claim 1, wherein in step (5), opening the AC circuit breakers (BR1 and BR2) of the first MMC and the second MMC to complete the DC fault processing, comprises:
for a temporary DC fault, after de-ionization time $t_5$, by the first and second converter stations, respectively sending a closing signal to the corresponding ultra-high speed mechanical switches at both ends of the HVDC transmission line, and at the same time, respectively sending an unlocking instruction to the first MMC and the second MMC, so that the HVDC transmission system resumes to the steady-state operation state;

for a permanent DC fault, after de-ionization time $t_5$, by the first and second converter stations, respectively sending a closing signal to the corresponding ultra-high speed mechanical switches at both ends of the HVDC transmission line, and at the same time, respectively sending an unlocking instruction to the first MMC and the second MMC; when it is detected again that the bridge-arm current of the MMC of one of the first and second converter stations exceeds the threshold value after $t_6$, performing the DC fault processing again according to steps (2)-(5).

5. The DC fault processing method according to claim 1, wherein after the full-bridge sub-modules in the MMC are locked, capacitors of the sub-modules are reversely connected to the HVDC transmission line to form an LC oscillation circuit together with a smoothing reactor, the bridge-arm reactor and the HVDC transmission line, so that a DC fault current is reduced to 0 within $t_3$ after the sub-modules are locked, and finally the ultra-high speed mechanical switch is opened.

6. The DC fault processing method according to claim 1, wherein during the $t_3+t_4$ period of fault processing, a three-phase interphase short circuit is actively created at a MMC valve side by closing the AC circuit breakers (BR1) and (BR2), so as to prevent a current of an AC system from flowing into a DC system and accelerate a process that the fault current oscillates to 0, and a total duration of $t_3+t_4$ does not exceed 30 ms.

* * * * *